Dec. 21, 1965  H. R. PAYNE  3,224,631
DISPENSING MECHANISM FOR ARTICLES IN FRONT TO BACK
STAGGERED STACKS
Filed June 6, 1963  7 Sheets-Sheet 1

INVENTOR
HARRY R. PAYNE
BY Cameron, Kerkam & Sutton
ATTORNEYS

Dec. 21, 1965    H. R. PAYNE    3,224,631
DISPENSING MECHANISM FOR ARTICLES IN FRONT TO BACK
STAGGERED STACKS
Filed June 6, 1963    7 Sheets-Sheet 2

INVENTOR
HARRY R. PAYNE
BY Cameron, Kerkam & Sutton
ATTORNEYS

INVENTOR
HARRY R. PAYNE
BY Cameron, Kerkam & Sutton
ATTORNEYS

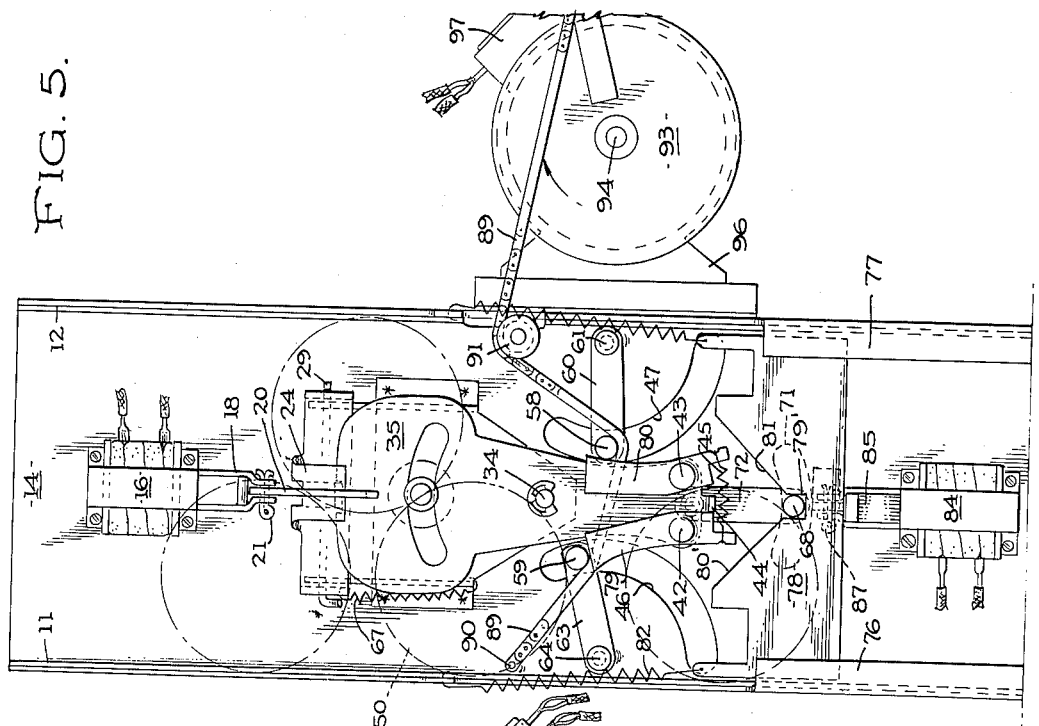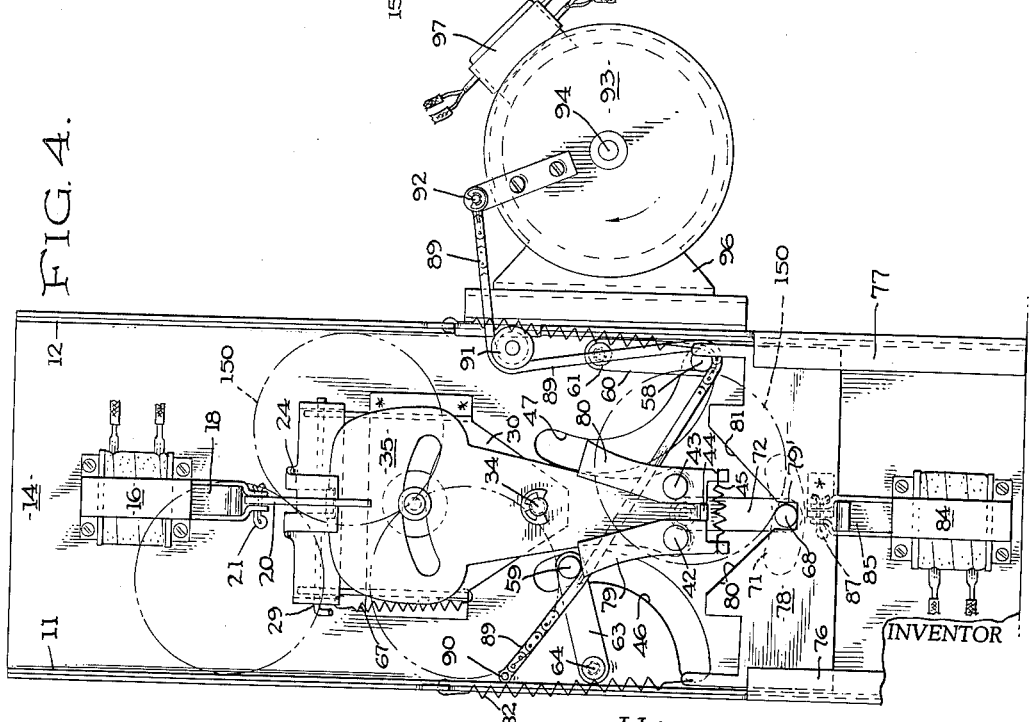

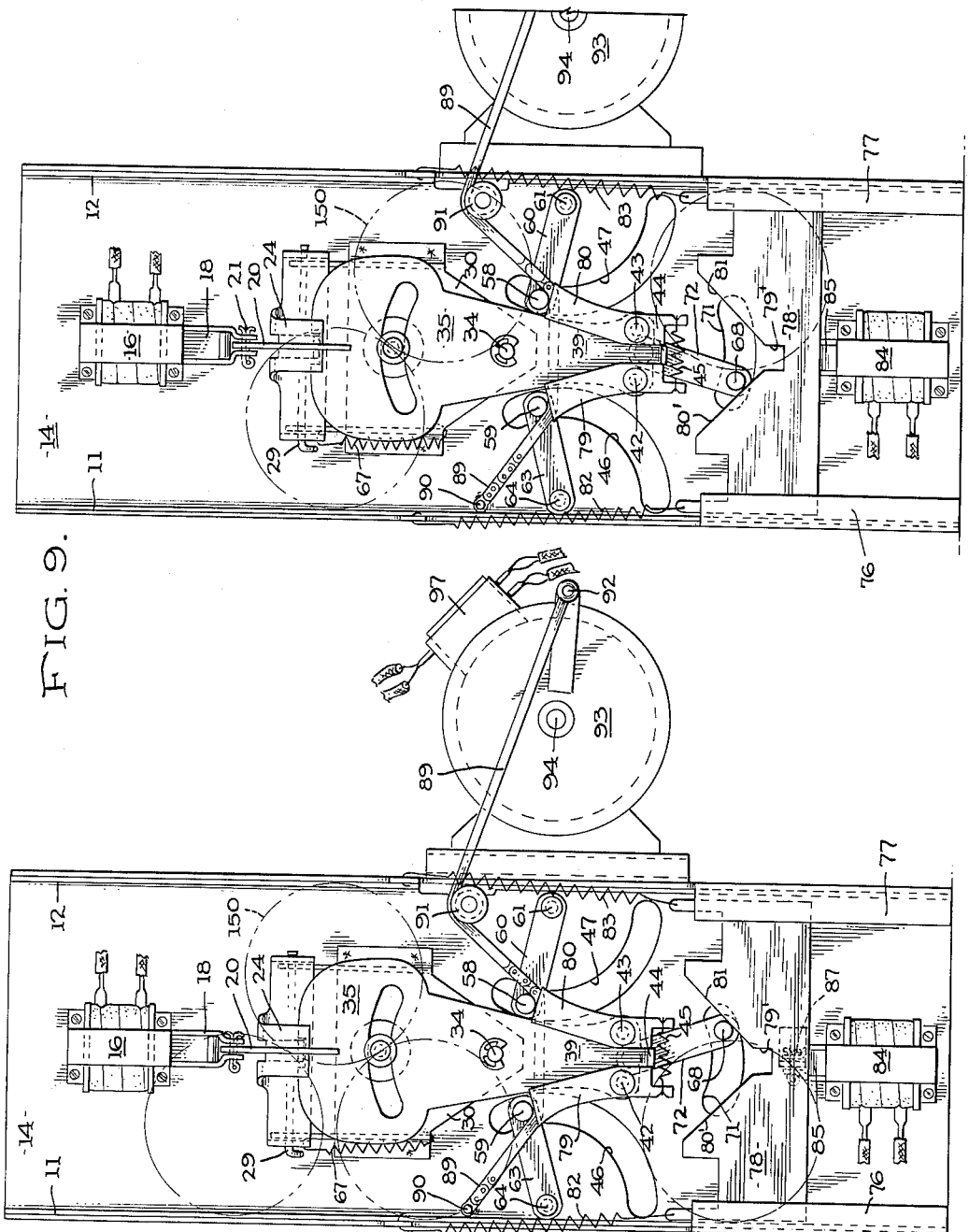

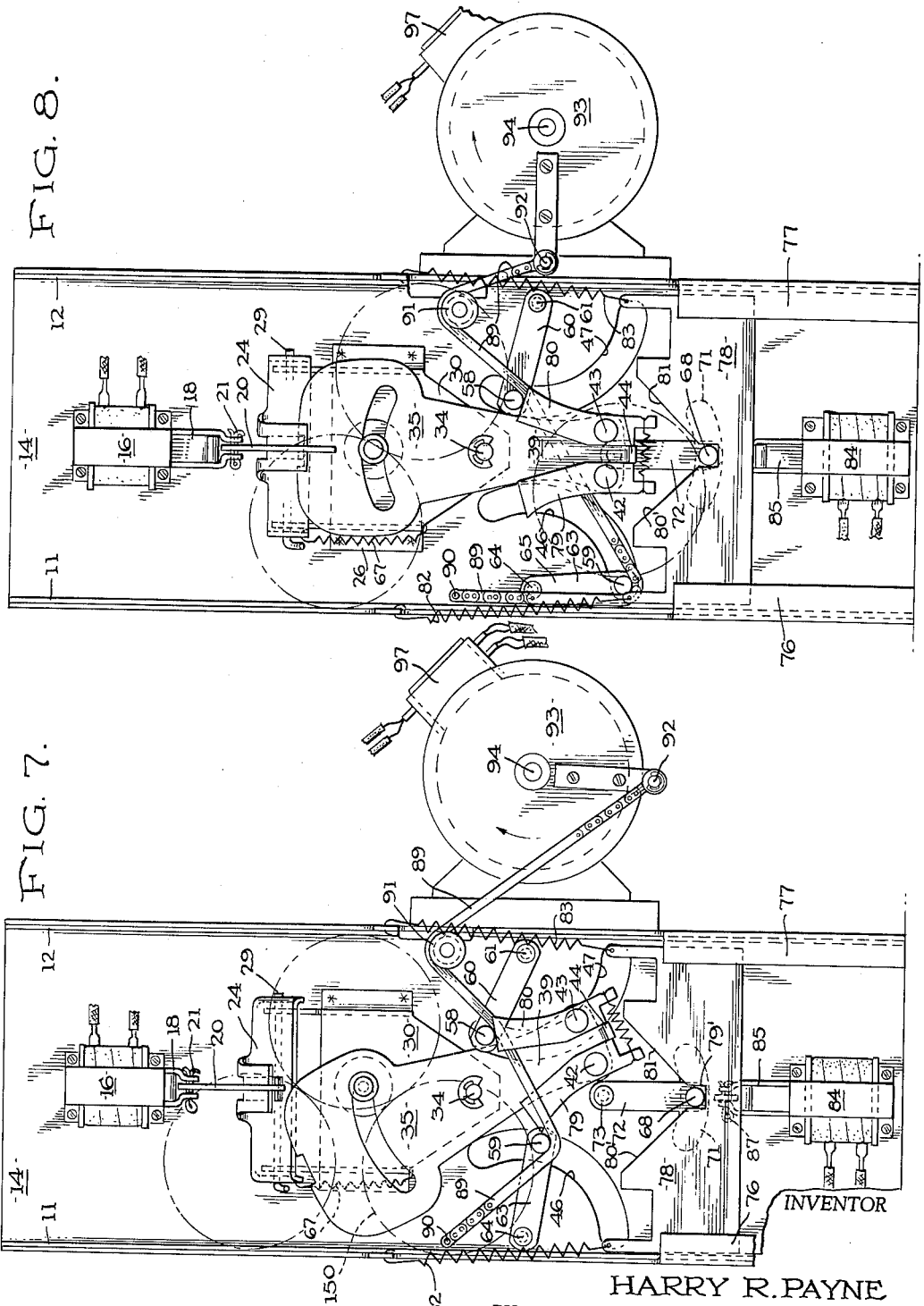

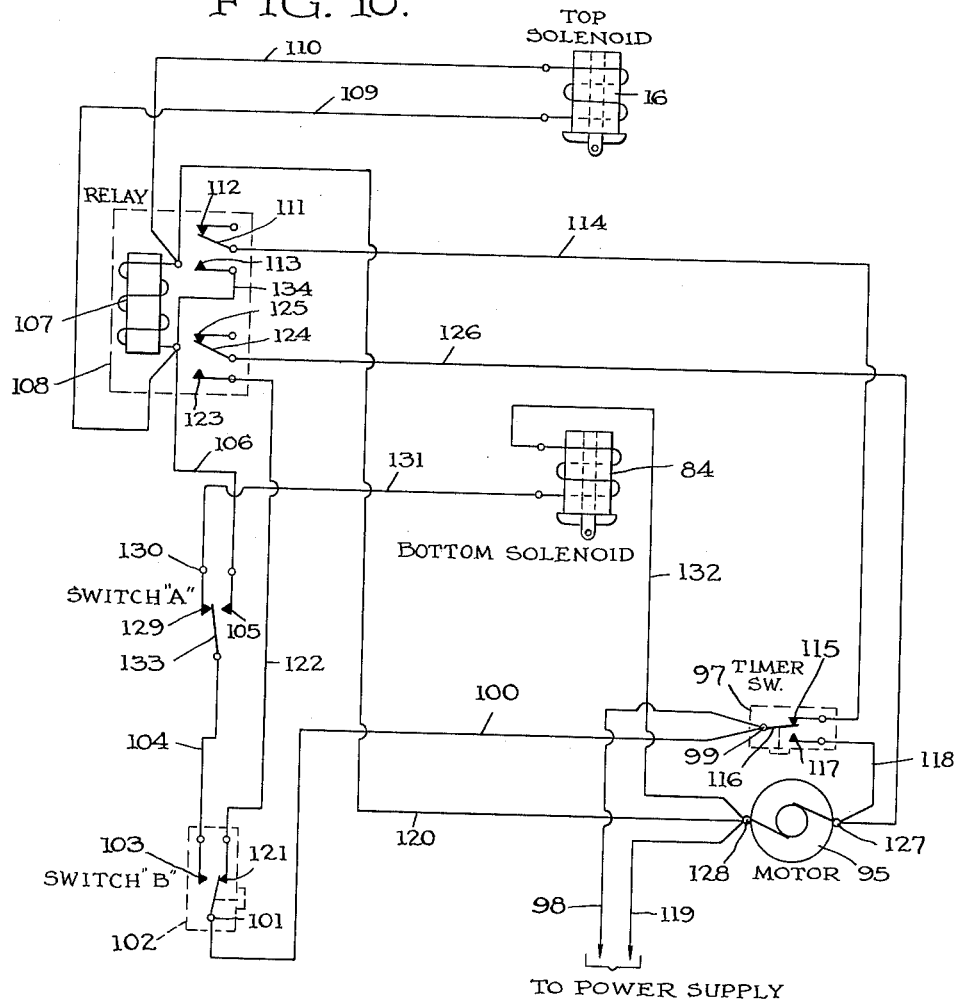

United States Patent Office

3,224,631
Patented Dec. 21, 1965

3,224,631
DISPENSING MECHANISM FOR ARTICLES IN
FRONT TO BACK STAGGERED STACKS
Harry R. Payne, Chattanooga, Tenn., assignor, by mesne
assignments, to The Seeburg Corporation, Chicago, Ill.,
a corporation of Delaware
Filed June 6, 1963, Ser. No. 286,012
8 Claims. (Cl. 221—15)

This invention relates to a dispensing mechanism for dispensing a single article at a time in sequence from a plurality of articles arranged in a front to back staggered stack.

Even more particularly this invention relates to a mechanism for dispensing a single article at a time in sequence from front to back staggered stacks of articles in which the releasing and dispensing mechanisms are actuated by the weight of the articles in the staggered stacks of articles and release of the releasing and dispensing mechanisms for dispensing a single article at a time from the staggered stack of articles is effected by electrically energized means.

Even more particularly still this invention relates to a dispensing mechanism for dispensing in sequence and one at a time an article such as a single can or bottle from front to back staggered stacks of articles, cans or bottles, hereinafter referred to for convenience as cans, in which the weight of the cans in the stacks actuates the releasing and dispensing mechanisms. The mechanism is released for the dispensing of a single can at a time by electrically energized means which may be energized from any suitable source and controlled by any suitable switch mechanism which switch mechanism may preferably be actuated by the deposit of a coin.

Even more particularly this invention relates to a dispensing mechanism in which two staggered stacks of cans are arranged in front to back relationship with a releasing mechanism common to both stacks for releasing a can from each stack when the releasing mechanism is energized with one can then being immediately dispensed and the other can being retained until the mechanism is again energized, as by the deposit of a second coin, whereupon the other can is released and dispensed.

At the present time articles such as cans of popular beverages are usually stored for selective sale in refrigerated cabinets with coin release mechanisms for dispensing one can at a time. In these cabinets the cans may be disposed on sloping shelves arranged one shelf above the other or the cans may be arranged in vertical staggered stacks in side by side bins. In the first type of dispenser in which the cans are arranged on sloping shelves the lowermost can on each shelf may move by gravity to a position where it can be withdrawn manually by the purchaser after a coin has been deposited to release a locking mechanism allowing withdrawal of one can at a time.

In the second type of apparatus, in which the cans are arranged vertically in columns in staggered stacks in side by side bins, various devices have been used for releasing one can at a time on the deposit of a suitable coin. Usually this release mechanism is driven by an electric motor and moves from beneath one can in the selected column in the selected staggered stack to a position beneath the next can to prevent more than one can from being dispensed at a time.

The first type of dispenser has advantages of relatively simple construction and the merchandise is visible for selection by the purchaser. A variety of types of beverage can be sold in this machine depending only on a number of sloping shelves provided. This multiplicity of variety is disadvantageous to the supplier who may place the machine on location since the machine can then be used for vending products other than those of the supplier.

In the second type of dispenser in which the cans are arranged in staggered stacks it has been found that the practical size of the cooler, doors and the like of the apparatus limits the number of double column staggered stacks side by side in the cabinet. The number of selections are therefore limited in a machine of maximum size. This is advantageous to the supplier since its limits the number of beverages that can be sold other than those of the supplier. A further advantage is that more cans can be stored in the staggered stack type dispenser than in the shelf type machine which is advantageous. Even greater capacity is obtained when the staggered stacks are arranged in front to back relationship. However, in the staggered stack machine, the delivery mechanism is usually motor-driven; it is expensive; and there is always the possibility of a mechanical jam of the mechanism in the automatic, positive drive of the dispensing mechanism for the cans.

Heretofore it has been proposed to dispense from stacks of articles or cans less than two diameters of the articles or cans in width with mechanism for holding the lowermost can in the stack first on one side of the stack and then on the other side of the stack. One such proposal is found in the copending application of Harry R. Payne and Jack M. Womack, Serial No. 98,062, filed March 24, 1961 for Dispensing Mechanism for Articles in Staggered Stack, now U.S. Patent No. 3,107,812, and owned by the assignee hereof. In the present invention the articles or cans being dispensed move the holding mechanism and particularly the latching portion thereof to the opposite position to support the next cans on the opposite side of the stacks in a one-latched-position or single step lowering of the can to be dispensed as generally described in the copending application of Harry R. Payne, Serial No. 239,165, filed November 21, 1962, now U.S. Patent No. 3,151,772. Thereafter one can is immediately dispensed and the other can is held by a swingable support, which is released when the mechanism is again actuated and swung by the weight of the can to release the can for dispensing.

In the dispensing mechanism proposed in the present application the latch is actuated by the weight of the stacks of cans to release the cans to be dispensed and is moved by the weight of the cans to a position to latch the support for the opposite and next cans in the stacks the swingable support for the can retained in the mechanism being locked in can retaining position with separate electrically actuated means being provided to release the swingable support when the mechanism is again actuated.

The dispensing mechanism of the present concept is relatively inexpensive to make, use and service, and permits dispensing at a fast rate without damage to the mechanism. The speed of actuation is advantageous in rush hours, permitting maximum sales. The mechanism of the present concept provides maximum capacity of cans; is simple to service; it eliminates vending errors; and is foolproof in operation.

A regulator may be provided with the mechanism of the present concept of the type described in the copending appliaction of Harry R. Payne, Serial No. 242,539 filed December 5, 1962, now U.S. Patent No. 3,151,770, which returns the can supports to normal and stand-by position.

In the present dispenser, when a coin is deposited or a switch in an electric circuit momentarily closed, a short pulse of electric current passes to the electrically energized means which suffices to actuate this means. This means then lifts a latch which in turn releases a rock plate releasing a support beneath the lowermost cans in the front to back staggered stacks of cans. At the same time the regulator is actuated to provide slack to a nonextensible flexible element beneath the supports. The released support then moves the rock plate out of its path and into position to lock an opposite can support. The descending stacks of cans rotate the opposite can support arm into an engagement with the rock plate and continue until the rock plate is rotated to its locked position, preventing further downward movement of the stacks of cans. The released support arm continues to rotate in a downward direction under the weight of the two cans at a rate determined by the regulator. One can only is then dispensed and the other can is retained by a separately released support. The lowermost cans thus move with controlled speed toward dispensing position and stacks of cans move slowly and with controlled speed downwardly until the next cans in the stacks of cans engage the opposite can support. Thereafter, the first support is returned to its upper, and stand-by and can supporting position by the regulator retensioning the flexible non-extensible element with rock plate locking the opposite can support against movement. The regulator remains energized after dispensing one of the cans and returns to initial position. Thereafter, when the mechanism is again energized, as by the deposit of a coin, the can retained in the mechanism will be released and dispensed.

This cycle can be repeated as many times as there are cans in the staggered stacks of cans so long as each cycle is started by the deposit of a coin or by the momentary closing of a switch in the electric circuit for the electrically energized means and thereafter the retained can is released by the deposit of another coin or by the momentary closing of a switch in the electric circuit for releasing the retained can.

The electrically energized or actuated means may be a solenoid, an electric motor or other suitable electrically actuated device for lifting the latch. The regulator is preferably energized by an electric motor in the circuit with the device for lifting the latch and the retained can is preferably released by energizing a solenoid actuated latch.

It is therefore an object of the present invention to provide a novel dispensing mechanism for dispensing one at a time a single article such as a can from staggered stacks of articles or cans in front to back relation which mechanism is actuated by the weight of the cans or articles in the staggered stacks at controlled speed and is released for freeing two articles or cans at a time by electrically energized means actuating a latch with electrically actuated regulator means controlling the dispensing mechanism, one can being dispensed at a time.

Another object of the present invention is to provide a dispensing mechanism having spaced opposed pivoted supports for alternately supporting the cans in front to back staggered stacks. The weight of the lowermost cans and of the cans thereabove in the stacks is used to move the support adjacent the lowermost cans downwardly into engagement with a stop mechanism which is locked in position by a solenoid actuated latch. This latch is released when the solenoid is momentarily energized, as by the deposit of a coin or by the momentary closing of a switch in the solenoid circuit, to permit the weight of the cans in the stacks to move the adjacent support downwardly into engagement with an electrically energized speed regulator. The stop is moved from beneath the support so that the support may swing to position to release the two lowermost cans at controlled speed with the remainder of the cans then being supported by the new lowermost cans which engage the opposite support. This opposite support is prevented from dispensing movement by the stop. After releasing the cans, the first support is returned to its support position by the regulator as the regulator returns to its initial position. One of the released cans is immediately dispensed and the other released can is held by the mechanism for dispensing when the mechanism is again actuated. The hold mechanism for the held can may be released by solenoid which is momentarily actuated by the deposit of a coin or by the closing of switch in its circuit.

Other and further objects of the present invention will appear from the following description of an illustrative embodiment thereof.

The illustrative embodiment of the present invention, as described hereinafter, should in no way be construed as defining or limiting the invention and reference should be had to the appended claims to determine the scope of the present inventive concept.

In the accompanying drawings, in which like reference characters indicated like parts, FIG. 1 is a front view of an embodiment of the present invention showing the relative position of the parts thereof with the rotary regulator in its normal or stand-by position;

FIG. 4 is a view of the embodiment of FIG. 1 in position releasing the lower right cans with the hold mechanism retaining the lower right can in the front stack;

FIG. 5 is a view similar to FIG. 4 with the regulator returning the right support rod to its raised and stand-by position;

FIG. 6 is a view similar to that of FIG. 1 with the regulator and support rods in stand-by position and the hold mechanism released to dispense the retained can in the front stack;

FIG. 7 is a view similar to that of FIG. 1 with the latch released and the regulator and left support rod moving toward release position for the two lower left cans;

FIG. 8 is a view similar to that of FIG. 7 with the mechanism in position to release the two lower left cans and with the hold mechanism retaining the lower left can of the front stack;

FIG. 9 is a view similar to FIG. 8 with the support rods and regulator in stand-by position and the hold mechanism released to dispense the retained lower left can; and FIG. 10 is a schematic circuit diagram for use with the embodiment of FIG. 1.

Figure 1:
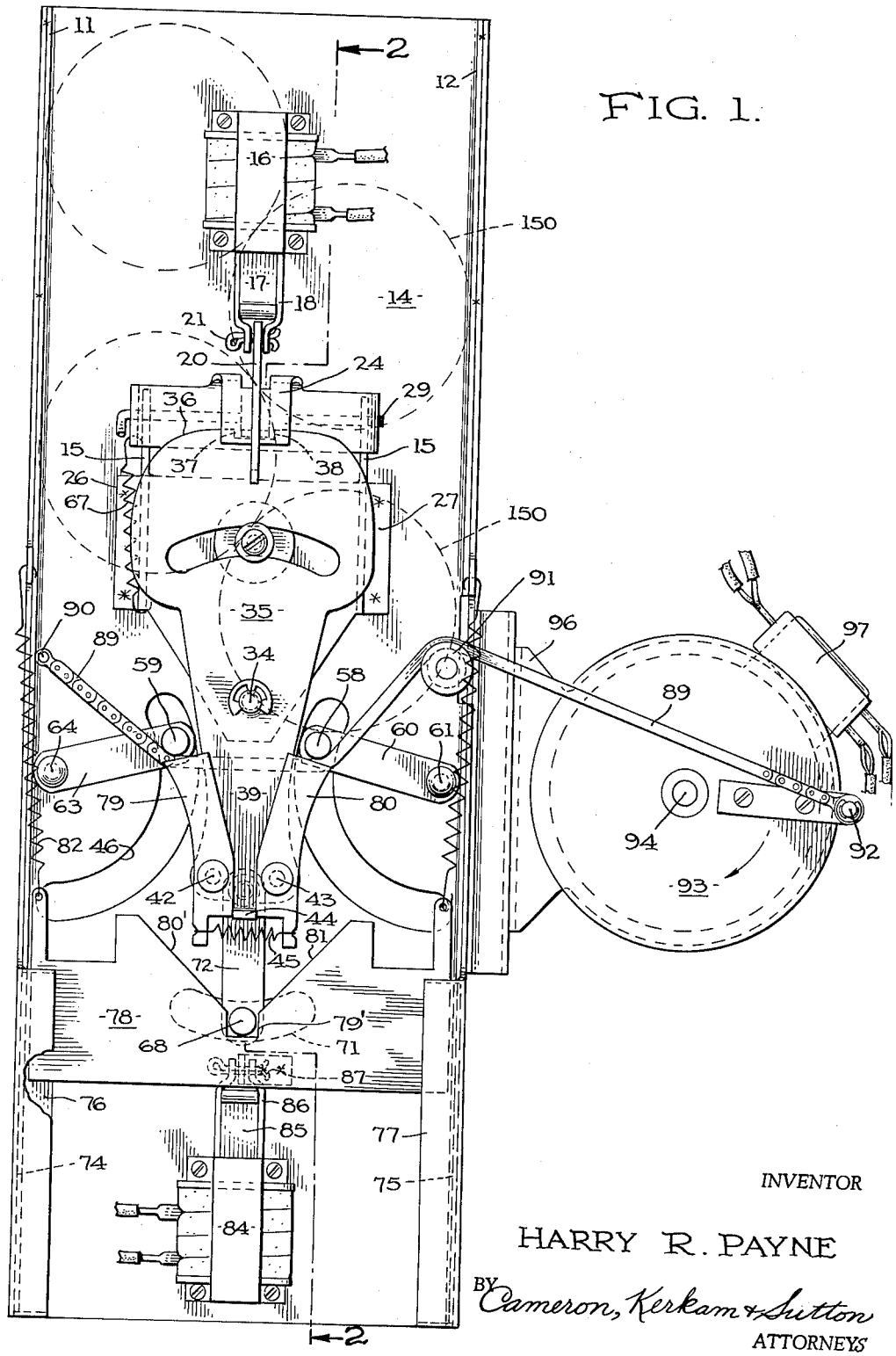
Figure 2:
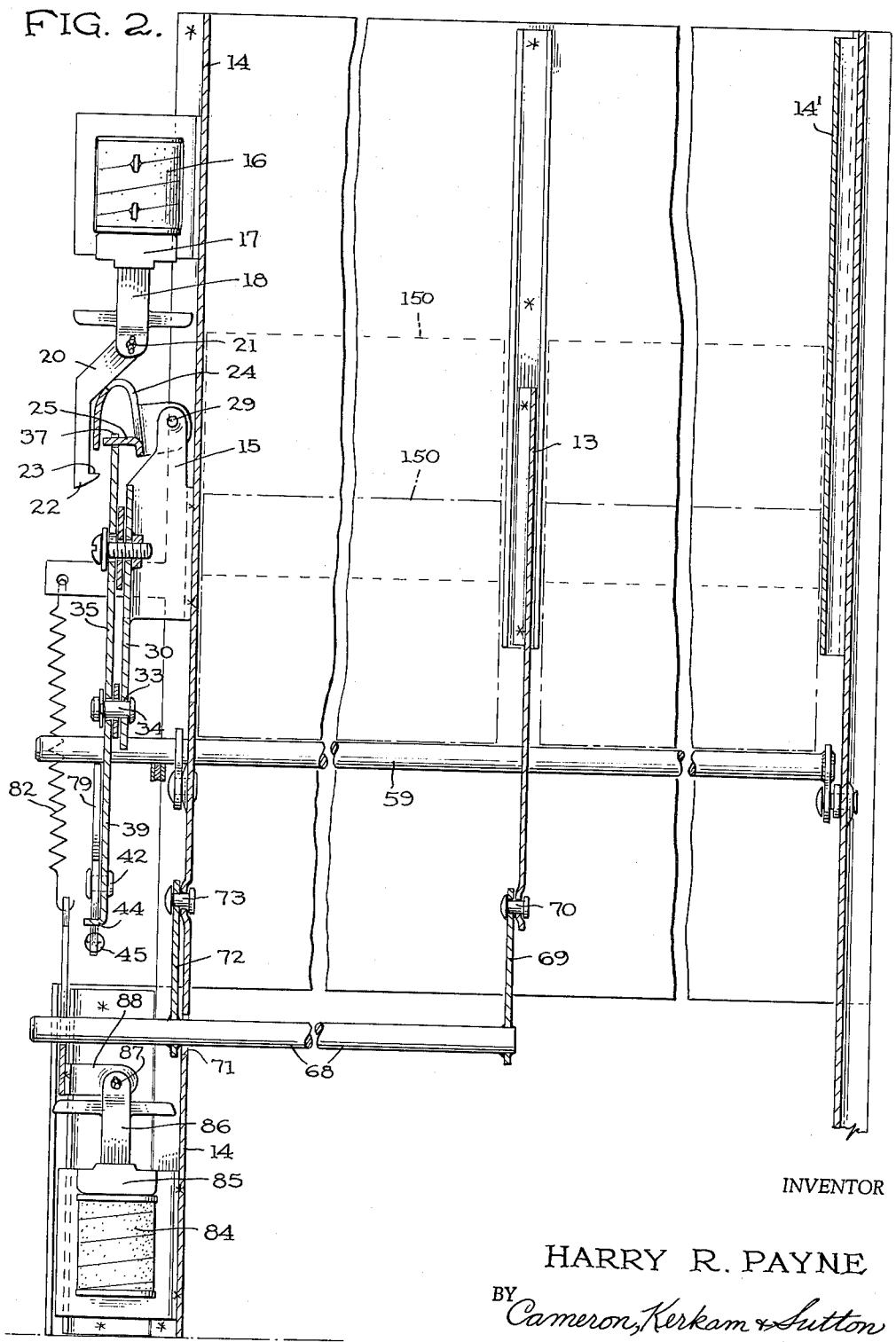
FIG. 2 is a view partly in section of the embodiment of FIG. 1 on the line 2—2 thereof.

Referring now to FIGS. 1 and 2, front to back bins for the staggered stacks of cans are provided having side walls 11 and 12 and a common center wall 13 and front and rear walls 14 and 14'. The side walls of the bins are spaced apart less than twice the diameter of the cans to be dispensed so that the cans will lie between the walls in staggered stacks, in known manner. The front and rear walls 14 and 14' and center wall 13 are spaced to accommodate the lengths of the cans to be dispensed in front to back staggered stacks. Brackets 15 are mounted on the central portion of front wall 14 by flanges 26 and 27. Solenoid 16 which is provided with plunger 17 is mounted on front wall 14. Plunger 17 has a rigid head 18 which in lowermost position lies adjacent to brackets 15. Arm 20 is pivotally mounted on plunger 17 at 21 and terminates at 22. Arm 20 is provided with a latch engaging shoulder 23 which in its lowermost position lies beneath latch 24 which is pivoted on rod 29 in brackets 15.

Latch 24 has tongue 25 which drops into a notch in the rock plate now to be described. A spring 67 may be used to pull latch 24 downwardly.

A face plate 30 is mounted on brackets 15 and is spaced from and is supported on front wall 14. Face plate 30 is bored adjacent its central lower portion at 33 to receive pivot 34 of rock plate 35. Rock plate 35 has an arcuate upper edge 36 which is provided with a notch formed by spaced stops 37 and 38. In stand-by position tongue 25 of latch 24 lies between stops 37 and 38. Rock plate 35 is reduced in width below pivot 34 to form shank 39. Beneath shank 39 rock plate 35 is widened to support tumbler plates 79 and 80. Tumbler plates 79 and 80 are pivoted at 42 and 43, respectively, on shank 39. Shank 39 has outturned portion 44 separating the tumbler plates. A spring 45 urges the tumbler plates into engagement with portion 44.

In the position shown in FIG. 1, tumbler plates 79 and 80 overlie arcuate slots 46 and 47, respectively, which slots are let into front wall 14.

A bottle support rod 58 extends the full length of the device being journaled in back 14' and extends through arcuate slot 47. Rod 58 is provided with an arm 60 which is journaled in front wall 14 at 61.

An opposed bottle support rod 59 extends the full length of the device being journaled in back 14' and extends through arcuate slot 46 and is provided with an arm 63 which is journaled at 64 in front wall 14.

A hold rod 68 is provided with an arm 69 which is pivoted at 70 on wall 13 midway between walls 11 and 12 beneath and medially of the front stack of cans only. Rod 68 extends through arcuate slot 71 in front wall 14 and is mounted for movement therein by arm 72 pivoted to front wall 14 at 73.

Side plates 74 and 75 extending from front wall 14 form guide tracks 76 and 77, respectively, in which lock plate 78 is mounted for vertical movement. Lock plate 78 is provided with centrally disposed notch 79' receiving rod 68. Guide surfaces 80' and 81 open from notch 79'.

Springs 82 and 83 extending from plate 78 to side walls 11 and 12, respectively, urge plate 78 upward to keep rod 68 in notch 79'. A solenoid 84 is mounted on front wall 14 and has an armature 85 and an arm 86 pivoted at 87 to extension 88 of plate 78. Energizing solenoid 84 draws plate 78 downward against the action of springs 82 and 83 to release rod 68 from notch 79' to permit rod 68 to swing in slot 71, for purposes that will appear more fully hereinafter.

A flexible non-extensible element such as a chain 89 is fastened to wall 11 at 90 in front of front wall 14 and beneath rock plate 35. Chain 89 passes over roller 91 mounted for rotation on front wall 14 adjacent side wall 12. The other end of chain 89 is secured at 92 at one end of a diameter of disc 93. Disc 93 is rotated by shaft 94 of electric motor 95. Motor 95 is mounted on bracket 96 secured to side wall 12. A limit switch 97 is actuated by disc 93, as will appear more fully hereinafter, to deenergize motor 95 after disc 93 has made one complete rotation from and back to the position shown in FIG. 1.

Referring now to the circuit diagram of FIG. 10, it will be seen that wire 98 leads from a suitable source of electric power to one side 99 of timer or limit switch 97. Wire 100 leads from side 99 to switch element 101 of switch 102, element 101 being normally in contact with side 121 of switch 102. Side 103 of switch 102 is connected by wire 104 to switch element 133 of switch 130. Switch element 133 normally engages side 129 of switch 130. Side 105 of switch 130 is connected by wire 106 to solenoid 107 of relay 108 and is extended by wire 109 to solenoid 16. The other side of solenoid 16 is connected by wire 110 to the other side of solenoid 107 and by wires 120 and 119 to the source of electric power.

Coil 107 actuates two switch elements 111 and 124 which normally engage unconnected contacts 112 and 125, respectively. Switch element 111 is connected by wire 114 to contact 115 of switch 97. Contact 117 of switch 97 is connected by wire 118 to connection 127 of motor 95. The other connection 128 of motor 95 is connected by wire 119 to the source of electric power.

Switch element 124 is connected by wire 126 to motor connection 127 and, when actuated, engages contact 123 which is connected by wire 122 to contact 121 of switch 102.

Contact 129 of switch 130 is connected by wire 131 to solenoid 84. The other side of solenoid 84 is connected by wire 132 to motor contact 128.

Assuming the several switches of FIG. 10 to be in the positions as shown, deposit of a coin in the mechanism to obtain a can of beverage or other goods will move switch element 133 into engagement with contact 105 and will move switch element 101 momentarily into engagement with contact 103. Electric current will then flow through wires 98 and 100, switch element 101 and contact 103, wire 104, switch element 133 and contact 105 and wire 106 to coil 107. Current also flows through wire 109 to solenoid 16 and returns through wires 110, 120 and 119 to the source of electric energy. The circuit for coil 107 is completed to the source of electric energy through wires 120 and 119. Solenoid 16 is energized raising latch 24 which releases two cans, as will appear more fully hereinafter, and relay 108 is energized, moving switch element 111 into engagement with contact 113 and moving switch element 124 into engagement with contact 123.

Current then flows through wires 98 and 100 to switch element 101 and contact 121, switch 102 having returned to its normal position, through wire 122 to contact 123 and switch element 124 and wire 126 to motor connection 127 to start motor 95, the motor circuit being completed through motor connection 128 and wire 119. In the meantime relay 108 is energized through wire 98, switch element 116, contact 115, wire 114, switch element 111, contact 113 and wire 134, this circuit being completed through wires 120 and 119.

Motor 95 then begins to rotate shaft 94 which through disc 93 closes switch 97 to move switch element 116 into engagement with contact 117. The motor circuit for motor 95 is then through wire 98, switch element 116-contact 117, wire 118, connection 127, connection 128 and wire 119. Motor 95 revolves disc 93 through one complete revolution which then moves switch element 116 back into engagement with contact 115. The circuitry is now deenergized and motor 95 stops relay 108 returned to normal position when switch element 116 left contact 115. In the meantime two cans have been released, one can dispensed and the other can held in the machine, all as will appear more fully hereinafter.

Switch 130 meanwhile has remained with element 133 in engagement with contact 105. When a second coin is inserted in the machine to obtain another can of beverage switch element 101 of switch 102 is momentarily moved into engagement with contact 103 and switch element 133 of switch 130 is moved into engagement with contact 129. A circuit is then completed through wires 98 and 100, switch element 133 and contact 129 and wire 131 to solenoid 84 and from solenoid 84 through wire 132 and 119 to the source of electric energy. Solenoid 84 is momentarily energized, switch 102 returning almost immediately to its initial position, as shown. Energizing solenoid 84 releases the can held in the mechanism, as will appear hereinafter, and this second can is then dispensed. The circuitry has now completed a full cycle and is in condition for the start of another cycle.

Figure 3:
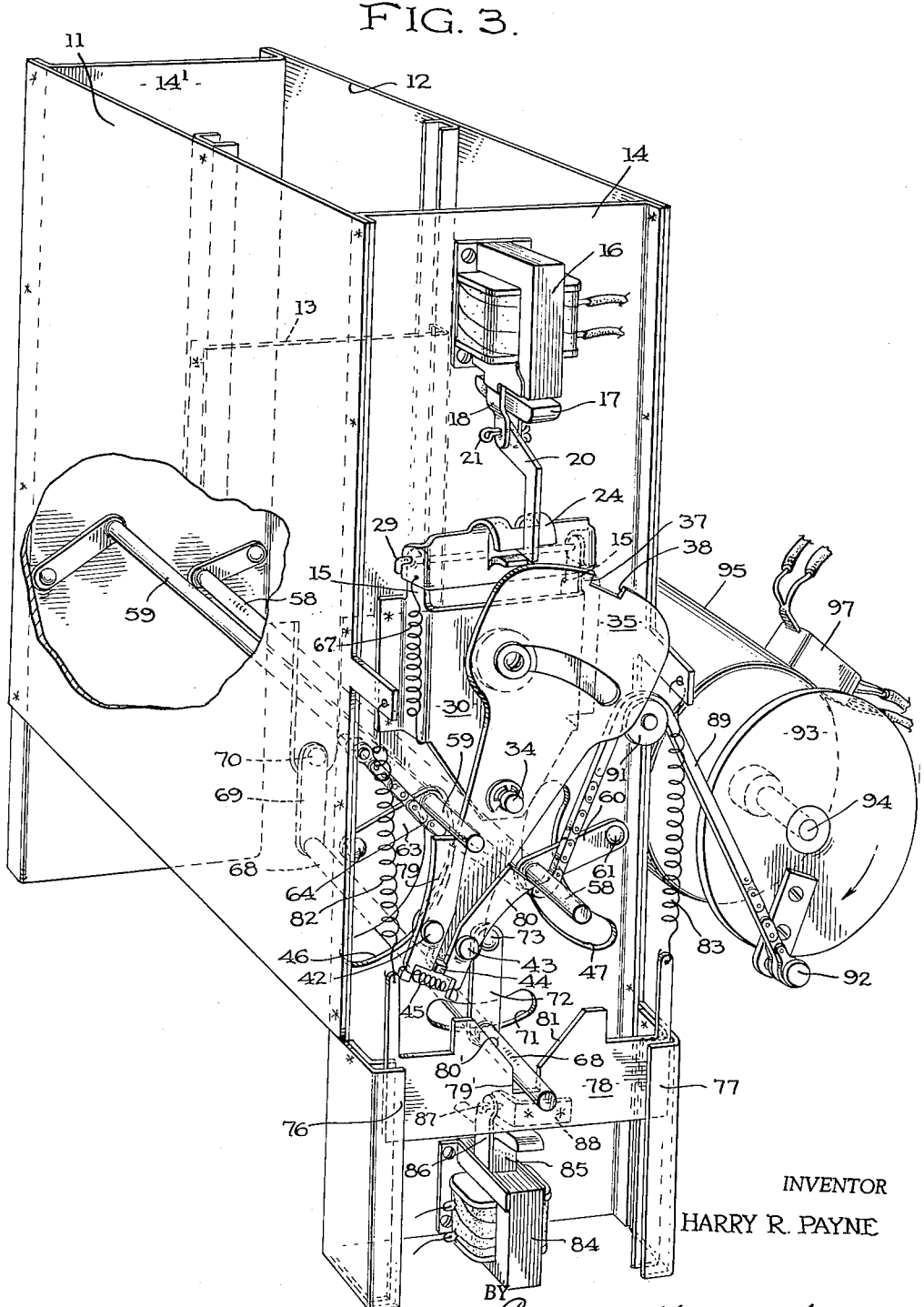
FIG. 3 is a perspective view, partly in section, of the embodiment of the present invention of FIG. 1 with the latch released and the support rod for the lower right cans moving toward can release position.

Referring now to FIGS. 1–6, and with the circuitry of FIG. 10 established and operating as above described, FIG. 1 shows the mechanism in stand-by condition with cans 150 in staggered stack with the lower right cans supporting the stacks of cans and resting on support rod 58. When a coin is inserted in the mechanism, switches 102 and 130 are energized, as above described, and solenoid 16 is energized to lift latch 24 and free tongue 25 from the notch in rock plate 35 formed between the shoulders 37 and 38. The weight of the stacks of cans on rod 58 moves rod 58 downwardly and through tumbler 80 moves rock plate 35 in a clockwise direction as seen in these figures. At the same time, motor 95 is energized and disc 93 is rotated in a clockwise direction as seen in these figures supplying slack to member 89 which permits rod 58, under the weight of the stacks of cans 150 to descend slowly. An intermediate position is shown in FIG. 3 where rod 58 is approximately half-way down. In the meantime, rock plate 35 has moved into position to support rod 59 which will receive the weight of the stacks of cans.

FIG. 4 shows the position of the mechanism when rod 58 has descended to its lowermost position freeing the lower right cans 150 in both stacks. The lower left cans in both stacks have now moved into engagement with support rod 59 and have moved it downwardly to lock rock plate 35 in a counterclockwise direction to bring the notch between shoulders 37 and 38 back into starting position when tongue 25 reenters the notch and is engaged by shoulder 38 to lock rock plate 35 in position and to lock support rod 59 in position.

With support rod 58 in its lowermost position, both lower right cans 150 in both stacks are released and the lower right can from the front stack of cans comes to rest on support rod 68 and is supported between rod 68 and wall 12. Rod 68 cannot move because it is engaged in notch 79' of lock plate 78. The lower right can 150 from the rear stack of cans immediately moves to dispensing position because support rod 68 is provided only for the front stack of cans.

Thereafter, clockwise rotation of disc 93 continues and the slack in element 89 is retrieved raising support rod 58 which, as shown in FIG. 5, moves the retained can out of its way and into position on the left side of rod 68 and also rotates tumbler 80 out of the way until rod 58 is in its normal raised position. At this point switch 97 is opened by disc 93 and the motor circuit is broken and the mechanism comes to rest having dispensed one can.

When the next coin is inserted in the mechanism only solenoid 84 is energized, as described with respect to FIG. 10. Energizing solenoid 84 draws lock plate 78 downward, freeing rod 68 from notch 79', as seen in FIG. 6, permitting the weight of the lower right can 150 from the front stack which has been moved to the left of rod 68 to swing rod 68 in a counterclockwise direction in arcuate slot 71 to permit this can to fall between rod 68 and wall 11 to dispensing position. As soon as can 150 passes between rod 68 and wall 11, springs 82 and 83 return lock plate 78 to its upper position and surface 81 thereof swings rod 68 back into position to be engaged in notch 79'. The mechanism is now ready for another cycle.

When the next cycle of operation of the apparatus is begun by the deposit of a coin, it will be noted, as seen in FIGS. 7, 8 and 9, that the lower left cans in each stack rest on rod 59 and support the weight of the stacks of cans 150 in both stacks of cans. Deposit of the coin energizes solenoid 16, as above described, lifting latch 24 and releasing rock plate 35 which is then rotated in counterclockwise direction, as seen in FIG. 7, and support rod 59 descends in engagement with element 89. Motor 95 is energized, as above described, and disc 93 starts its single revolution in clockwise direction to provide slack for element 89 which permits support rod 59 to descend. Movement of rock plate 35 in counterclockwise direction brings tumbler 80 into position beneath support rod 58 and holds support rod 58 in upper position to receive the weight of the stack of cans in both stacks of cans when the lower left cans move toward release position.

As seen in FIG. 8, all available slack has been provided for element 89 and support rod 59 is in its lowermost position permitting the two lower left cans to be released. The lower left can 150 in the rear stack then moves to dispensed position and the lower left can 150 in the front stack rests uopn rod 68 and its retained in the mechanism. Motor 95 continues its rotation to complete the single revolution of disc 93 and this rotation of disc 93 retrieves the slack in member 89 which returns support rod 59 to its upper position moving the retained can over to the right side of rod 68 and tripping tumbler 79 during its return. In the meantime, the weight of the stacks of cans on support rod 58 has rotated rock plate 35 in a clockwise direction until tongue 25 of latch 24 again enters the notch between shoulders 37 and 38.

When the disc 93 completes its single rotation, switch 97 is actuated and breaks the circuit to electric motor 95 and the mechanism is locked against further dispensing action until another coin is inserted.

When the next coin is inserted, solenoid 84 is energized, as above described, drawing lock plate 78 downward and releasing rod 68 from notch 79. The weight of the can resting on rod 68 then swings rod 68 in a clockwise direction, as seen in FIG. 9, and the can falls between rod 68 and side wall 12 and is dispensed. As soon as this can is dispensed, springs 82 and 83 return lock plate 78 to its upper position and cam surface 80', acting on rod 68, swings rod 68 into position to be engaged in notch 79'. The mechanism is now locked against further dispensing action and is ready for the next cycle.

It should now be apparent to those skilled in the art that the present invention in every way satisfies the several objectives discussed above.

Changes in or modifications to the above described illustrative embodiment of this invention may now be suggested without departing from the present inventive concept. For example, the concept is not limited to but a single pair of front to back staggered stacks. A plurality of pairs of front to back staggered stacks may be arranged in side by side relationship. Separate electrical circuits can be used with each pair of stacks to provide for selective choice of beverage or other goods in the cans. Only one regulator would be required and it would be actuated during the appropriate portion of the cycle of operations for each stack. Reference should therefore be had to the appended claims to determine the scope of this invention.

What is claimed is:

1. Mechanism for dispensing a single can at a time from two front to back staggered stacks of cans in a bin, comprising two opposed can supports adjacent the lower end of the bin for said stacks mounted for downward rotary movement from an upper normal position to can releasing position and supporting in turn the lowermost cans of the stacks of cans in the bin, latch means for the supports mounted for oscillatory movement and engaging and holding the support engaged by the lowermost cans in the stacks of cans against downward rotation when the mechanism is in stand-by condition, a notch in said latch means, a latch normally engaged in said notch locking the latch means against movement, first solenoid means for releasing the latch from said notch to thereby release the latch means whereby the weight of the cans rotates the can support beneath the two lowermost cans in the stacks downward toward can releasing position and moves the latch means beneath the other can support preventing downward rotation thereof, said latch then reentering said notch, a regulator for control of releasing said cans disposed beneath said supports in standby position for engagement by said supports, means actuated upon the release of said latch for controlled movement of said regulator in the paths of movement of said supports while maintaining engagement between the rotating support and said regulator, retaining means for one of said released cans in the mechanism, said other released can being dispensed, and second solenoid actuated means for releasing said retaining means for dispensing the retained one of said cans.

2. Mechanism as described in claim 1, said regulator comprising a non-extensible flexible element extending beneath said supports, means for securing an end of said element to the bin and means for tensioning said element comprising an eccentric secured at the other end of said element, an electric motor rotating said eccentric through one complete revolution and circuit means for energizing said motor when said first solenoid means is energized.

3. Mechanism as described in claim 1, said retaining means comprising a swingably mounted hold rod supporting the retained can and a reciprocally mounted lock plate engaging and locking said hold rod, said second solenoid means moving said lock plate out of locking engagement with said hold rod.

4. Mechanism as described in claim 1, said retining means comprising a swingably mounted hold rod medially disposed beneath one stack of cans supporting the retained can, spaced guide tracks on the bin, a lock plate mounted for reciprocation in said tracks and resilient means urging said lock plate into locking engagement with said hold rod, said second solenoid means moving said lock plate out of locking engagement with said hold rod.

5. Mechanism for dispensing a single can at a time from two front to back staggered stacks of cans in a bin comprising means for releasing the lowermost can in each stack of cans and for immediately dispensing one of said released cans and means for retaining the other of said released cans in the mechanism comprising a movable hold rod supporting the retained can only, a reciprocal lock for said hold rod and solenoid means for reciprocating said lock and for releasing said rod when the mechanism is next actuated whereby said rod is moved by the weight of the retained can and the retained can is dispensed.

6. Mechanism as described in claim 5, said lock comprising a notched reciprocal plate, spring means for engaging said hold rod in said notched plate and means connecting said plate and said solenoid means whereby when said solenoid means is energized said notched plate is moved and releases said hold rod.

7. Mechanism as described in claim 5, said hold rod being medially disposed beneath one stack of cans and spaced guide tracks on the bin, said lock comprising a notched plate mounted in said tracks and normally engaging said hold rod in the notch and means for connecting said notched plate and said solenoid means whereby when said solenoid means is energized said notched plate is disengaged from said hold rod releasing said hold rod.

8. Mechanism for dispensing a single can at a time from at least one pair of front to back staggered stacks of cans comprising means for releasing the lowermost cans in one pair of front to back staggered stacks and for immediately dispensing one of said released cans and means for retaining the other of said released cans in the mechanism comprising a movable hold rod supporting the retained can only, a reciprocal lock for said hold rod and solenoid means for reciprocating said lock and for releasing said rod when the mechanism is next actuated whereby said rod is moved by the weight of the retained can and the retained can is dispensed.

References Cited by the Examiner
UNITED STATES PATENTS

| | | | |
|---|---|---|---|
| 2,438,502 | 3/1948 | Holt | 221—67 X |
| 2,762,524 | 9/1956 | Johnson | 221—67 |
| 2,825,488 | 3/1958 | Nelson | 221—67 |
| 2,988,246 | 6/1961 | Johnson et al. | 221—67 |

RAPHAEL M. LUPO, *Primary Examiner.*

KENNETH N. LEIMER, LOUIS J. DEMBO,
*Examiners.*